US012596963B2

(12) United States Patent
Havel et al.

(10) Patent No.: US 12,596,963 B2
(45) Date of Patent: Apr. 7, 2026

(54) MACHINE-LEARNING BASED RECORD PROCESSING SYSTEMS

(71) Applicant: Capital One Services, LLC, McLean, VA (US)

(72) Inventors: Gunther Havel, Portsmouth, NH (US); John Wilson, Richmond, VA (US); Ashwin Assysh Sharma, Minneapolis, MN (US)

(73) Assignee: Capital One Services, LLC, McLean, VA (US)

( * ) Notice: Subject to any disclaimer, the term of this patent is extended or adjusted under 35 U.S.C. 154(b) by 945 days.

(21) Appl. No.: 17/858,581

(22) Filed: Jul. 6, 2022

(65) Prior Publication Data

US 2024/0013100 A1 Jan. 11, 2024

(51) Int. Cl.
| | |
|---|---|
| *G06N 20/20* | (2019.01) |
| *G06F 18/2113* | (2023.01) |
| *G06F 18/22* | (2023.01) |
| *G06Q 20/38* | (2012.01) |

(52) U.S. Cl.
CPC ......... *G06N 20/20* (2019.01); *G06F 18/2113* (2023.01); *G06F 18/22* (2023.01); *G06Q 20/389* (2013.01)

(58) Field of Classification Search
CPC ...... G06N 20/00; G06N 20/20; G06Q 20/389; G06F 18/2113; G06F 18/22
See application file for complete search history.

(56) References Cited

U.S. PATENT DOCUMENTS

| | | | | |
|---|---|---|---|---|
| 11,687,575 | B1 * | 6/2023 | Nguyen ............... | G06F 16/325 |
| | | | | 707/747 |
| 11,887,079 | B2 * | 1/2024 | Godshall .............. | G06Q 20/102 |
| 12,346,306 | B2 * | 7/2025 | Katz ................... | G06F 16/2365 |
| 12,400,247 | B2 * | 8/2025 | Saito .................... | G06Q 40/02 |
| 12,412,221 | B2 * | 9/2025 | Jeske ................. | G06F 9/45558 |
| 2016/0364794 | A1 | 12/2016 | Chari et al. | |
| 2019/0318347 | A1 * | 10/2019 | Aguiar .............. | G06Q 20/4016 |
| 2020/0012980 | A1 * | 1/2020 | Li .......................... | G06N 5/048 |
| 2020/0126037 | A1 * | 4/2020 | Tatituri ................. | G06N 20/00 |
| 2020/0184281 | A1 * | 6/2020 | Le ....................... | G06F 18/2411 |
| 2022/0076231 | A1 * | 3/2022 | Farrell ................... | G06Q 20/34 |
| 2022/0351210 | A1 * | 11/2022 | Ramani ............. | G06Q 20/4016 |

(Continued)

OTHER PUBLICATIONS

Conceptual-Framework-for-Improving-Bank-Reconciliation-Accuracy-Using-Intelligent-Audit Controls, Journal of Frontiers in Multidisciplinary Research, Author: Sandra Orobosa Ikponmwoba, E-ISSN: 3050-9726, P-ISSN: 3050-9718, vol. 01 Issue: 01, Published: Dec. 5, 2020 p. 57-70. (Year: 2020).*

*Primary Examiner* — Barbara M Level
(74) *Attorney, Agent, or Firm* — Banner & Witcoff, Ltd.

(57) ABSTRACT

Aspects described herein may allow unmatched records in databases be matched automatically. For example, a computing device may receive source records and target records to be matched together. The computing device may determine, based on a machine learning model and for each of the plurality of target records, a distance value between the respective target record, and a subset of the plurality of source records. A matched record that identifies the subset of the plurality of source records and a selected one or more target records may be generated. The matched record may be configured to update records in a database.

20 Claims, 9 Drawing Sheets

Source Records 505

Target Records 510

Source Clusters 515

Target Clusters 520

(56) References Cited

U.S. PATENT DOCUMENTS

| | | | |
|---|---|---|---|
| 2022/0398583 A1* | 12/2022 | Crudele | G06Q 40/125 |
| 2022/0405836 A1* | 12/2022 | Gorman | G06Q 40/12 |
| 2023/0067073 A1* | 3/2023 | McCormick | G06Q 40/12 |
| 2023/0073140 A1* | 3/2023 | Richter | G06Q 20/02 |

* cited by examiner

300

Receive a plurality of source record items and a plurality of target record items — 305

Select a subset of the plurality of source record items — 310

Determine, for each of the plurality of target record items, a distance value — 315

Rank the plurality of target record items — 320

Select one or more target record items — 325

Generate a matched record — 330

Send the matched record — 335

| Account 462 | Entity 464 | Credit/Debit 466 | Loan Number 468 | Date 470 | Amount 472 |
|---|---|---|---|---|---|
| | | | | | 405 |
| 12003 | GL | Credit | 7565677 | 4/3/20 | -1545 |
| 95684 | GL | Credit | 4526852 | 4/18/20 | -670 |
| 95684 | GL | Credit | 5468320 | 4/26/20 | -4500 |
| 45675 | GL | Credit | 1934453 | 4/25/20 | -50 |

| Account 462 | Entity 464 | Credit/Debit 466 | Loan Number 468 | Date 470 | Amount 472 |
|---|---|---|---|---|---|
| | | | | | 430 |
| 45675 | Bank | Debit | 1934453 | 4/1/20 | 178 |
| 56700 | Bank | Debit | 4526852 | 4/5/20 | 5000 |
| 45675 | Bank | Debit | 1934453 | 4/11/20 | 3200 |
| 12003 | Bank | Debit | 7565677 | 4/3/20 | 1000 |
| 12003 | Bank | Debit | 7565677 | 4/4/20 | 545 |

| Account | Source | Credit/Debit | Loan Number | Date | Amount | Distance |
|---------|--------|--------------|-------------|--------|--------|----------|
| 45675 | Bank | Debit | 1934453 | 4/1/20 | 178 | 4 |
| 56700 | Bank | Debit | 4526852 | 4/5/20 | 5000 | 4 |
| 45675 | Bank | Debit | 1934453 | 4/11/20 | 3200 | 10 |
| 12003 | Bank | Debit | 7565677 | 4/3/20 | 1000 | 0 |
| 12003 | Bank | Debit | 7565677 | 4/4/20 | 545 | 1 |

| Account | Source | Credit/Debit | Loan Number | Date | Amount | Distance |
|---------|--------|--------------|-------------|------|--------|----------|
| 12003 | Bank | Debit | 7565677 | 4/3/20 | 1000 | 0 |
| 12003 | Bank | Debit | 7565677 | 4/4/20 | 545 | 1 |
| 45675 | Bank | Debit | 1934453 | 4/1/20 | 178 | 4 |
| 56700 | Bank | Debit | 4526852 | 4/5/20 | 5000 | 4 |
| 45675 | Bank | Debit | 1934453 | 4/11/20 | 3200 | 10 |

MACHINE-LEARNING BASED RECORD PROCESSING SYSTEMS

FIELD OF USE

Aspects of the disclosure relate generally to data processing. More specifically, aspects of the disclosure may provide for systems and methods for processing data records stored in a database based on machine learning models.

BACKGROUND

Double-entry accounting is a widely used accounting system that is aimed at facilitating the accuracy of financial statements and reducing the chance of errors. In a double-entry accounting system, every transaction is recorded as an amount of debt incurred in a debit account, and is recorded as the same amount of credit incurred in a credit account. During the auditing stage, the system determines if every record in the debit account matches one or more records in a credit account, and/or every record in the credit account matches one or more records in a debit account. If every record match, the records are deemed to be accurate. If some records are unmatched, an error checking mechanism may be initiated to figure out if some records are wrongly entered. However, the debit accounts and credit accounts in an organization may be maintained differently and therefore one transaction may be described differently in the credit accounts and the debit accounts. When thousands of such records from both the credit accounts and debit accounts are imported into a database during the auditing stage, it is difficult to determine which records match.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Determining whether every record in the debit account matches one or more records in a credit account, and/or every record in the credit account matches one or more records in a debit account, is a crucial auditing process in a double-entry accounting system. However, one transaction may be described differently in a debit account and a credit account. For example, a transaction may be recorded into a debit account on a different date than when the transaction is recorded in a credit account. In another example, a transaction may be recorded as one single record in a debit account but as two or more records in one or more credit accounts. The amount of balance indicated in each of the two or more records may be different from the one single record (since the total amount of balance of the two or more records may be equal to the one single record). Current computing systems cannot determine which records in debit accounts match which records in credit accounts unless the records are described almost identical (e.g., being recorded on the same date, at the same amount of balance in both accounts). The unmatched records may trigger a manual error checking process, which may cost a huge amount of effort, even if the records are in fact matched but only described differently.

To overcome limitations in the prior art described above, and to overcome other limitations that will be apparent upon reading and understanding the present specification, aspects described herein are directed towards processing data records from different sources (e.g., different accounts) and identifying matched records based on machine learning models to reduce the effort of manual error checking process.

Aspects discussed herein may provide a computer-implemented method for automatically matching relevant data records, received from different sources, into groups. In at least one embodiment, a computing device may receive, by a computing device, a plurality of source records and a plurality of target records. The computing device may select a subset of the plurality of source records and determine, based on a machine learning model and for each of the plurality of target records, a distance value between: the respective target record, and the subset of the plurality of source records. In some instances, the distance value is a gower distance value. The computing device may rank, based on the distance value of each of the plurality of target records, the plurality of target records. The computing device may select, based on the ranking, one or more target records of the plurality of target records and generate a matched record identifying: the selected one or more target records, and the subset of the plurality of source records. The matched record is configured to update records in a first database. The computing device may send, to the first database, the matched record.

In some instances, each of the plurality of source records and the plurality of target records may be a transaction record that indicates a balance amount. Generating the matched record may be further based on determining that a total balance amount of the subset of the plurality of source records equals a total balance amount of the selected one or more target records.

In some instances, the computing device may further receive, from the first database via a cloud storage bucket, the plurality of source records and the plurality of target records.

In some instances, the plurality of source records and the plurality of target records may be unmatched in the first database.

In some instances, each of the plurality of target records may comprise a plurality of data fields, and determining the distance value may comprise: identifying one or more data fields of the plurality of data fields; and calculating the distance value based on data within the one or more data fields.

In some instances, the computing device may further divide, based on a second machine learning model comprising a clustering algorithm, the plurality of source records into one or more subsets.

In some instances, the computing device may select the subset of the plurality of source records by determining a distance value between each two source records of the subset does not exceed a threshold.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A, 4B, 4C and 4D are example records in accordance with one or more illustrative aspects discussed herein;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Determining whether every record in the debit account matches one or more records in a credit account, and/or every record in the credit account matches one or more records in a debit account, is a crucial auditing process in a double-entry accounting system. However, one transaction may be described differently in a debit account and in a credit account. Current computing systems cannot determine which records in debit accounts match which records in credit accounts unless the records are described almost identical. The unmatched records may trigger a manual error checking process, which may cost a huge amount of effort, even if the records are in fact matched but only described differently.

By way of introduction, aspects discussed herein may relate to systems, methods, techniques, apparatuses, and non-transitory computer-readable media for processing data records based on machine learning models.

Before discussing these concepts in greater detail, however, several examples of a computing device that may be used in implementing and/or otherwise providing various aspects of the disclosure will first be discussed with respect to FIG. 1.

Figure 1:
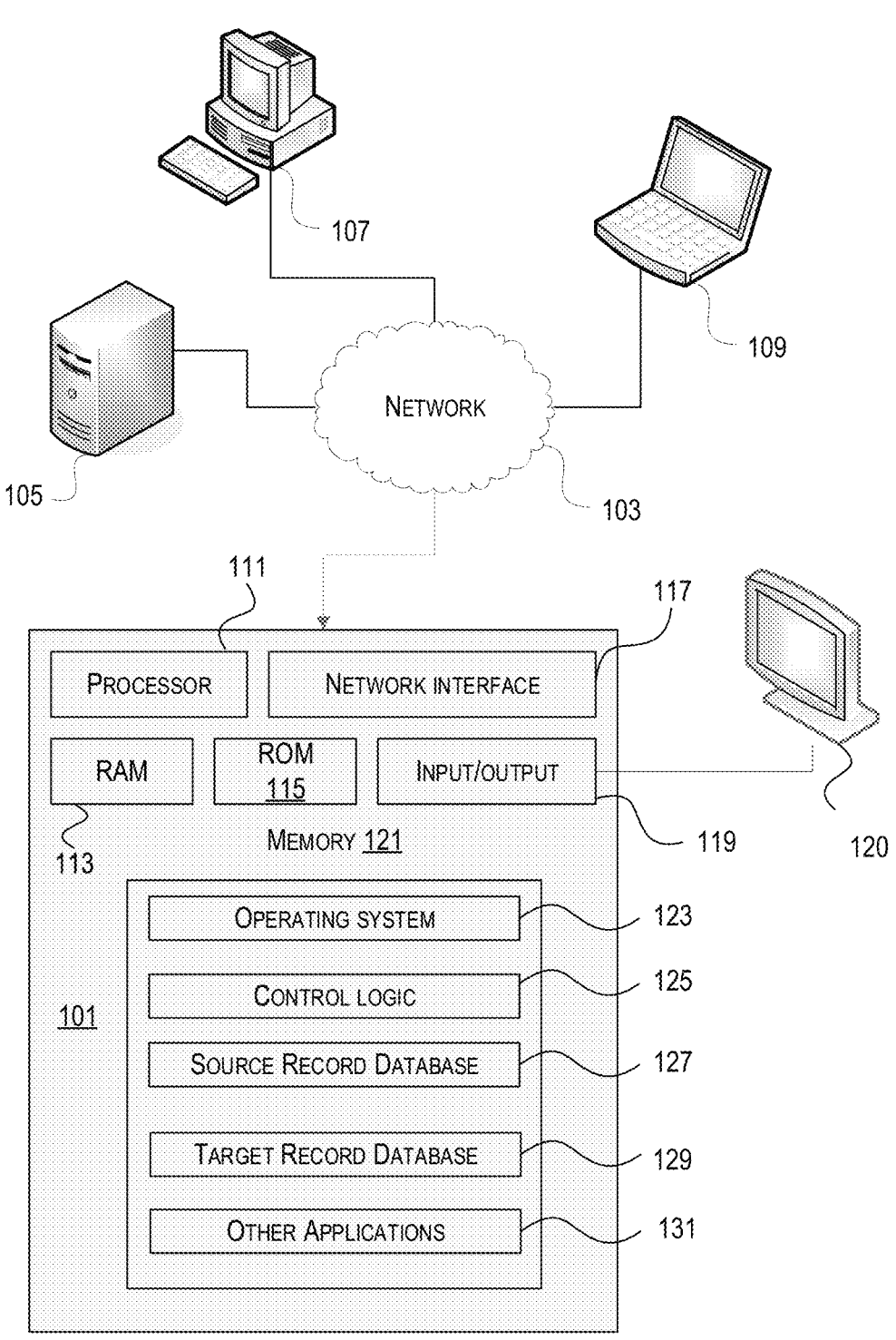
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading or executing instructions and performing one or more actions based on the instructions. In some embodiments, computing device 101 may represent, be incorporated in, or include various devices such as a desktop computer, a computer server, a mobile device (e.g., a laptop computer, a tablet computer, a smartphone, any other type of mobile computing devices, and the like), or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), or other processing units such as a processor adapted to perform computations associating converting information, routing copies of messages, or other functions described herein. I/O 119 may include a variety of interface units and drives for reading, writing, displaying, or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, source record database 127, target record database 129, and other applications 131 may be stored in a memory of a computing device used at a server system that will be described further below. Control logic 125 may be incorporated in or may comprise a linking engine that updates, receives, or associates various information stored in the memory 121. In other embodiments, computing device 101 may include two or more of any or all of these components (e.g., two or more processors, two or more memories, etc.) or other components or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

The data transferred to and from various computing devices may include secure and sensitive data, such as confidential documents, customer personally identifiable information, and account data. Therefore, it may be desirable to protect transmissions of such data using secure network protocols and encryption, or to protect the integrity of the data when stored on the various computing devices. A file-based integration scheme or a service-based integration scheme may be utilized for transmitting data between the various computing devices. Data may be transmitted using various network communication protocols. Secure data transmission protocols or encryption may be used in file transfers to protect the integrity of the data such as, but not limited to, File Transfer Protocol (FTP), Secure File Transfer Protocol (SFTP), or Pretty Good Privacy (PGP) encryption. In many embodiments, one or more web services may be implemented within the various computing devices. Web services may be accessed by authorized external devices and customers to support input, extraction, and manipulation of data between the various computing devices. Web services built to support a personalized display system may be cross-domain or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, or firewalls. Such specialized hardware may be installed and configured in front of one or more computing devices such that any external devices may communicate directly with the specialized hardware.

Figure 2:
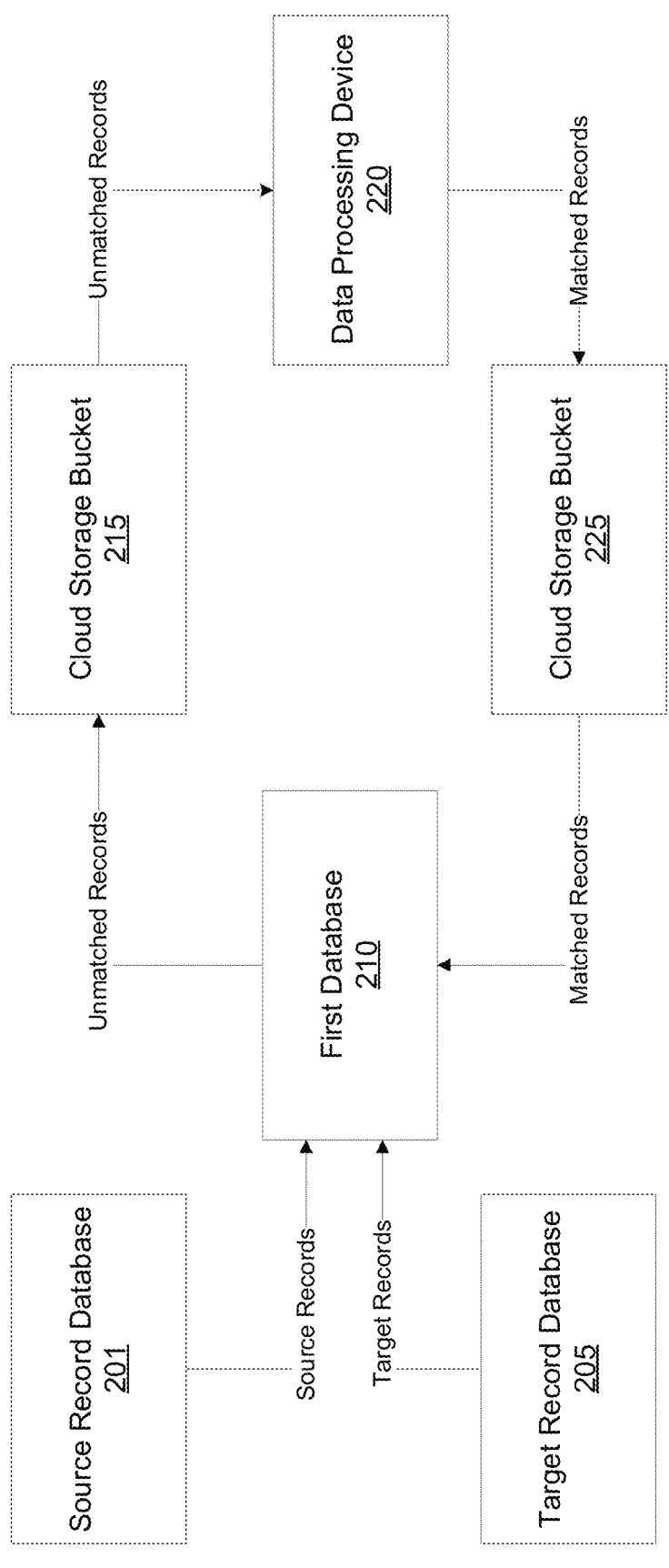
FIG. 2 depicts an example computing environment in accordance with one or more illustrative aspects discussed herein.

FIG. 2 depicts an illustrative computing environment for processing data records in accordance with one or more example embodiments. Referring to FIG. 2, computing environment 200 may include source record database 201, target record database 205, first database 210, cloud storage bucket 215, data processing device 220, and cloud storage bucket 225.

The source record database 201 and target record database 205 may be associated with a double-entry accounting system of an organization. For example, the source record database 201 may be configured to store records associated with one or more debit accounts. The target record database 205 may be configured to store records associated with one or more credit accounts. For each transaction that the organization conducts, one or more debit-account records may be recorded in the debit accounts and one or more credit-account records may be recorded in the credit accounts. If the records are entered correctly, the one or more debit-account records associated with the transaction may match the one or more credit-account records associated with the transaction (e.g., the total amount of balance of the one or more debit-account records associated with the transaction may be equal to the total balance of the one or more credit-account records associated with the transaction).

The first database 210 may be configured to receive source records from the source record database 201 and target records from target record database 205. The first database 210 may be configured to match source records and target records during the auditing process (e.g., periodically) in order to determine whether accounting errors occur. For example, the first database 210 may conduct an initial matching by identifying source records and target records that have the same parameters (e.g., the same transaction date and same amount of balance).

However, as discussed above, the source records may be generated differently from the target records that are associated with the same transaction. For example, if the organization receives a loan of $10,000, the payment may be received by two different credit accounts, each of which may receive $5,000. There may be two credit records generated and stored in the target record database 205, each indicating $5,000 is received. However, there may be one record with a balance of $10,000 in the source record database 201 that records the organization incurs $10,000 of liability. The first database 210 may not be able to match the two records from the target record database 205 with the one single record from the source record database 201, because each of the target records has an amount of balance that is different from the balance amount of the source record, even if the unmatched does not actually indicate an accounting error occurs.

After detecting unmatched records, the first database 210 may export those unmatched records to the data processing device 220 for further processing (e.g., determining whether some of the unmatched records actually match, based on further analysis).

After receiving the unmatched records, the data processing device 220 may be configured to analyze the unmatched records in accordance with one or more aspects described herein and identify source records and target records that are matched, even if not every parameter are identical. The data processing device 220 may generate the matched record and send the matched records back to the first database 210, so that the first database 210 may update the stored data, and reduce the need to initiate a manual error-checking process.

The communication between the first database 210 and the data processing device 220 may be via a network. Additionally or alternatively, the communication between the first database 210 and the data processing device 220 may be via one or more cloud storage buckets 215 and 225. For example, the first database 210, after performing the initial matching, may send unmatched records to the cloud storage bucket 215. After a certain number of records have been uploaded, the cloud storage bucket 215 may send an event trigger command to the data processing device 220. The data processing device 220 may send a response, to the cloud storage bucket 215, to pull the unmatched records. After the records are pulled by the data processing device 220, the cloud storage bucket 215 may clear records. After the data processing device 220 identifies matched records, the matched records may be sent to the cloud storage bucket 225. The cloud storage bucket 225 may upload the matched records to the first database 210.

Although the source records and target records discussed herein use the example that those are records in a double-entry accounting system, the source records or the target records may be generated in other contexts, and records are determined to match based on other relations. For example, the source record may be an image taken from a camera. The source record may be determined to match one or more target records based on the target records are images taken at overlapping locations.

Figure 3:
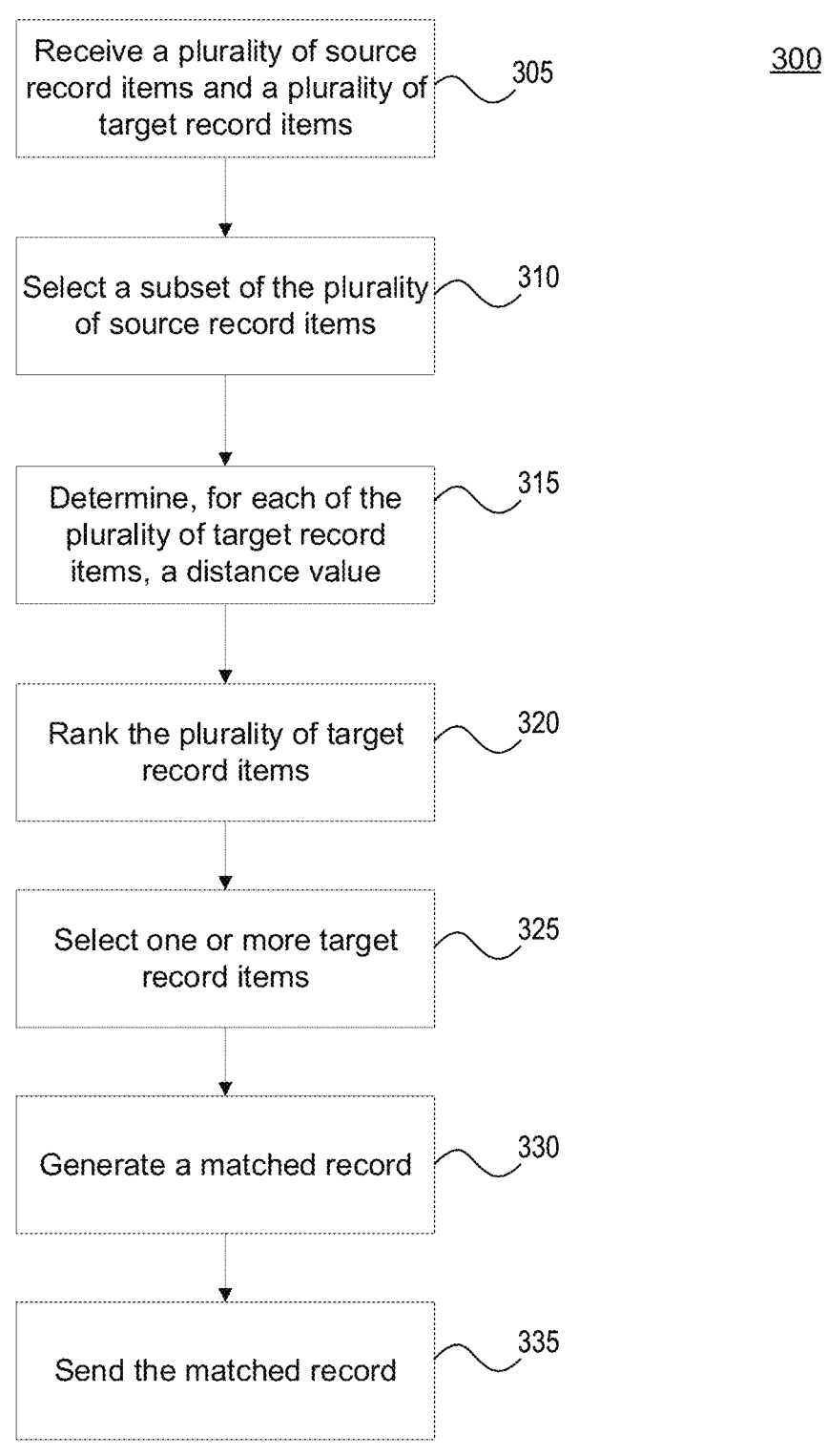
FIG. 3 is a flow diagram of an example method for processing records in accordance with one or more illustrative aspects discussed herein.

FIG. 3 is a flow diagram depicting a method 300 for processing data records in accordance with one or more illustrative aspects discussed herein. The steps in method 300 may be performed by a system comprising, for example, one or more cloud storage bucket 215 and one or more of a data processing device 220 as may be shown in FIG. 2.

At step 305, the system (e.g., the data processing device 220) may receive a plurality of source records and a plurality of target records. The plurality of source records and the plurality of target records may be received from the first database 210 as shown in FIG. 2. For example, the first database 210 may be configured to perform an initial match between source records from a source record database 201 with target records from a target record database 205, and then export records that the first database 210 is unable to match based on a preliminary analysis (e.g., based on determining certain parameters in a source record is identical with a target record). Consistent with the example of a double-entry accounting system as discussed in connection with FIG. 2, the source records may be records for transactions associated with one or more credit accounts. The target records may be records for transactions associated with one or more debit accounts. The one or more credit accounts and the one or more debit accounts may be both associated with an organization. In a double-entry accounting system, one or more source records may be determined to match one or more target records, if the one or more source records are determined to be associated with the same transaction with which the one or more target records are associated. One or more source records and one or more target records may be determined to match based on multiple factors (e.g., similar transaction dates, related transaction accounts, and/or the total balance amount are equal in absolute value, etc.).

Figures 4A, 4B:
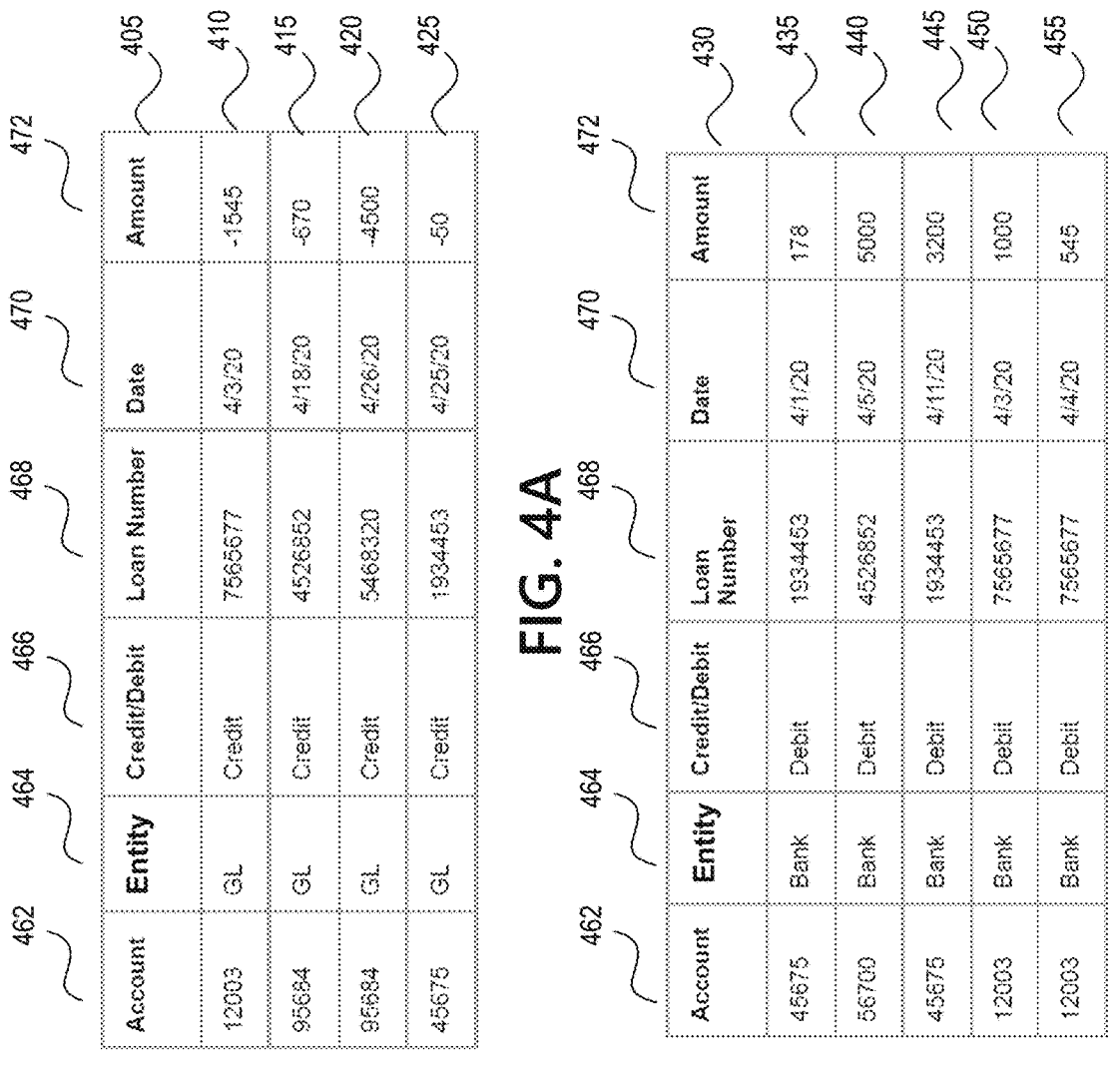

FIG. 4A depicts an example of a plurality of source records received by the system. As shown in FIG. 4A, table 405 may list a plurality of source records 410, 415, 420, and 425. It is appreciated that the number of source records is only examples, and any numbers (e.g., thousands) of source records may be possible. As shown in FIG. 4A, each source record may comprise one or more data fields, each data field may indicate one aspect of information associated with the transaction that is recorded. Each column of table 405 may correspond to a data field in the record. For example, data field 462 may indicate an account number involved in the transaction, data field 464 may indicate the entity that records the record, data field 466 may indicate whether the record indicates a credit aspect or a debit aspect of the transaction, data field 468 may indicate a loan number assigned to the corresponding transaction, data field 470 may indicate the date of the corresponding transaction, and data field 472 may indicate the balance involved in the corresponding transaction. For example, the source record 410 may indicate a transaction that is associated with account number 12003. The source record 410 may be recorded by the general ledger department, and the record may indicate a credit aspect of the transaction. The source record 410 may also indicate the loan number associated with the transaction is 7565677, the date of the credit incurred is Apr. 3, 2020, and the balance amount is −1545 dollars. It is appreciated that the one or more data fields shown in table 405, or the value in each record, are merely examples. One or more data fields shown in FIG. 4A may be omitted, or one or more additional data fields that indicate other aspects of the transaction (e.g., the specific time the transaction incurs, the subject matter associated with the transaction, etc.) may be included.

Similarly, FIG. 4B depicts an example of a plurality of target records received by the system. As shown in FIG. 4B, table 430 may list a plurality of target records 435, 440, 445, 450, and 455. It is appreciated that the number of target records is only examples, and any numbers (e.g., thousands) of target records may be possible. As shown in FIG. 4B, each source record may comprise one or more data fields, each data field may indicate one aspect of information associated with the transaction that is recorded. For example, each column of table 430 may correspond to a data field in the record. For example, data field 462 may indicate an account number involved in the transaction, data field 464 may indicate the entity that records the record, data field 466 may indicate whether the record indicates a credit aspect or a debit aspect of the transaction, data field 468 may indicate a loan number assigned to the corresponding transaction, data field 470 may indicate the date of the corresponding transaction, and data field 472 may indicate the balance involved in the corresponding transaction. For example, the target record 435 may indicate a transaction that is associated with an account number 45675. The target record 435 may be recorded by the bank during the ordinary course of transactions, and the record may indicate a debit aspect of the transaction. The target record 435 may also indicate the loan number associated with the transaction is 1934453, the date of the credit incurred is Apr. 1, 2020, and the balance amount is 178 dollars. It is appreciated that the one or more data fields shown in the table 430, or the value in each record, are merely examples. One or more data fields shown in FIG. 4B may be omitted, or one or more additional data fields that indicate other aspects of the transaction (e.g., the specific time the transaction incurs, the subject matter associated with the transaction, etc.) may be included. FIG. 4B shows the target record comprises the same data fields with the source records, but it is appreciated that some of the data fields in a target record may be omitted in the source records, or some of the data fields in the source records may be omitted in a target record.

As may be shown in FIG. 4A and FIG. 4B, there may not be a target record that matches the source record 410 on its face. For example, there may not be a target record that indicates a transaction having the same absolute amount of balance and/or the same transaction date as the source record 410. Therefore, the first database 210 may not be able to match the source record 410 with any target records during a preliminary match, and may send the records to the system for further analysis.

Referring back to FIG. 3, at step 310, the system may select a subset of the plurality of source records. The subset of the source records may be determined by the system as recording the same transaction or a series of related transactions. The system may operate in ate least two modes. One mode may be referred to as "one-to-many" matching mode. In a "one-to-many" matching mode, each individual source record may be selected as one separate subset (e.g., each source record may be treated as a record of one independent transaction) and the system may conduct analysis as discussed herein to find out whether one or more target records match the individual source record. The other mode may be referred to as "many-to-many" matching mode. In a "many-to-many" matching mode, one or more source records are grouped together and the group may be selected as a subset (e.g., two or three source records that are determined to be associated with the same transaction or a series of related transactions may be grouped together as a subset), and the system may conduct analysis to find out whether one or more target records match the group of source records. The target records may be grouped in a way similar as the source records are grouped before the matching.

For the purpose of simplicity, the following steps of FIG. 3 may be discussed using the example of the "one-to-many" matching mode. However, it is appreciated that the following discussion may also be used in a "many-to-many" matching mode as long as the system treats a group of source records as one source record discussed in the following steps. The selection of the one or more source records as a group, as well as any other unique operations in the "many-to-many" matching mode, may be discussed in greater detail below in connection with FIGS. 5-7.

At step 315, the system may determine, based on a machine learning model and for each of the plurality of target records, a distance value between: the respective target record, and the subset of the plurality of source records selected at step 310. The distance value may indicate the similarity between the respective target record and the subset of the source records. For example, a greater distance value between two records (or two groups of records) may indicate the two records (or two groups of records) are less similar, and a shorter distance value between two records (or two groups of records) may indicate the two records (or two groups of records) are more similar. For example, the distance value may be a Gower distance value.

In "one-to-many" matching mode, the system may calculate the distance value between two records (a given source record and each target record in the plurality of the target record) by calculating the distance value between each corresponding data field of the two records, and then weighing the distance value between each data field to obtain the distance value between the two records. One or more of the data fields may be selected. The selection may be made based on whether the similarity of that data field in two records strongly correlates to whether the two records match. The system may select one or more data fields of the plurality of data fields, calculate the distance value of each of the one or more data fields, and weight the distance value of each data field to obtain the distance value for the entire record. It is appreciated that various approaches may be used to calculate the distance of each field. For example, if the value of a data field is numeric, the distance between the corresponding field of two records may be the square root of the squared differences of the two numeric values in the corresponding fields. In another example, if the value of a data field is non-numeric, the distance between the corresponding fields of two records may be assigned based on whether the values of the two non-numeric values are the same (e.g., the distance may be 0 if the two values are the same, the distance may be 1 if the two values are different). It is appreciated that other approaches to calculate distances are possible.

The machine learning model may be trained by a set of training data to optimize parameters (e.g., the selection of the one or more data fields, formulas to calculate the distance of each data field, weights for each data field, etc.) associated with calculating the distance value. For example, the machine learning model may be trained to maximize the percentage of records that the system may be able to match, while maintaining a certain level of accuracy. In the "many-to-many" matching mode, the system may calculate the distance value between two groups of records (a given group of source records, and, each target record or group of target records). A machine learning model may be trained to optimize parameters similarly.

FIG. 4C depicts an example of distance values between the source record 410 as shown in FIG. 4A and each target record in FIG. 4B. In the example shown in FIG. 4C, the system may select data fields 462, 468, and 470 to calculate the distance value. However, it is appreciated that more data fields, or fewer data fields, may be selected. The distance value for each target record may be shown in table 460, column 474. As shown in column 474, the distance between the source record 410 and target record 435 may be 4. The distance between the source record 410 and target record 440 may be 4. The distance between the source record 410 and target record 445 may be 10. The distance between the source record 410 and target record 435 may be 0. The distance between the source record 410 and target record 435 may be 1. It is appreciated that the distance value is merely an example.

Referring back to FIG. 3, at step 320, the system may rank, based on the distance value of each of the plurality of target records, the plurality of target records. For example, the plurality of target records may be ranked from the lowest distance value to the highest distance value. FIG. 4D depicts table 480 where the target records 435, 440, 445, 450, and 455 are ranked based on the distance value. As may be shown in FIG. 4D, the target record 450 is ranked highest, which may indicate that the target record 450 may be most similar to the source record 410 as shown in FIG. 4A. The target record 455 is ranked second. The target record 435 is ranked third. The target record 440 is ranked fourth. The target record 445 is ranked the last, which may indicate that the source record 410 and the target record 445 are the least similar.

At step 325, the system may select, based on the ranking, one or more target records of the plurality of target records. The selected one or more target records may be determined by the system as matching the subset of source records.

There are multiple ways to select the one or more target records. In some examples, the system may determine certain higher-ranked target records (e.g., the top one record, the records having a distance value less than a threshold, etc.) as matching the subset of source records. In other examples, the system may first filter out lower ranked target records (e.g., filter out the last 50% of records, filter out records having a distance value greater than a threshold, etc.). The system may then analyze, based on additional rules, target records that are not filtered out to determine which one or more of the target records matches the subset of source records. Additionally or alternatively, the system may apply additional rules to each target record in an order based on the ranking until the system finds the matched records. If no matched records are found after all the target records that are not filtered out have been analyzed, the system may determine the subset of source record are not matched. In the "one-to-many" matching mode, the system may send, to the first database 210, an indication that the source record is not matched. In the "many-to-many" matching mode, the system may either send an indication that the subset of source records is not matched, or the system may re-group one or more of the source records and determine the system is able to find out any matched target records for the new group of source records.

For example, the additional rules to find matched double-entry accounting records may be that a total amount of balance of the subset of source records, adding to a total balance amount of the one or more matched target records, equals to zero. Consistent with FIG. 4D, the system may determine the balance amount of the target record 450, which may be ranked the highest, is 1000 dollars. Then, the system may determine the target record 455, which may be ranked the second highest, is 545 dollars. Therefore, the total amount of balance of the target records 450 and 455 may be 1545 dollars. As shown in FIG. 4A, the balance amount of the source record 410 is −1545 dollars. Therefore, the total amount of balance of target records 450 and 455, adding to the total balance amount of the source record 410, equals zero. The system may determine the source record 410 matches the target records 450 and 455.

It is appreciated that the one or more target records that match the subset of source records may not be ranked consecutively at the top. For example, there may be a second target record whose distance with the source record 410 is 0.5 (ranked higher than target record 455 but lower than target record 450). However, that second target record may have a balance of 2000 and therefore may not be related to the transaction associated with the source record 410. In such situations, the system may skip the second record and still select the target record 450 and 455 as the matched records based on the amount of balance. It is appreciated that a person with ordinary skill in the art would be able to use algorithms, such as dynamic processing, to find out the target records with the desired total balance amount among the higher-ranked target records.

Referring back to FIG. 3, at step 330, the system may generate a matched record identifying: the selected one or more target records, and the subset of the plurality of source records. The matched record may be configured to update records in a first database 210. For example, the system may generate a matched identification (ID) number and assigned the matched ID number to the source record 410, the target record 450, and the target record 455.

At step 335, the system may send, to the first database 210, the matched record. The first database 210, after receiving the matched record, may update the status of the source records and target records from "unmatched records" to "matched records." During an error checking process, the matched records may not need to be sent to manual error-checking or manual matching. This may help the first database 210 to efficiently maintain data records.

The steps of method 300 may be modified, omitted, or performed in other orders, or other steps added as appropriate.

Figure 5:
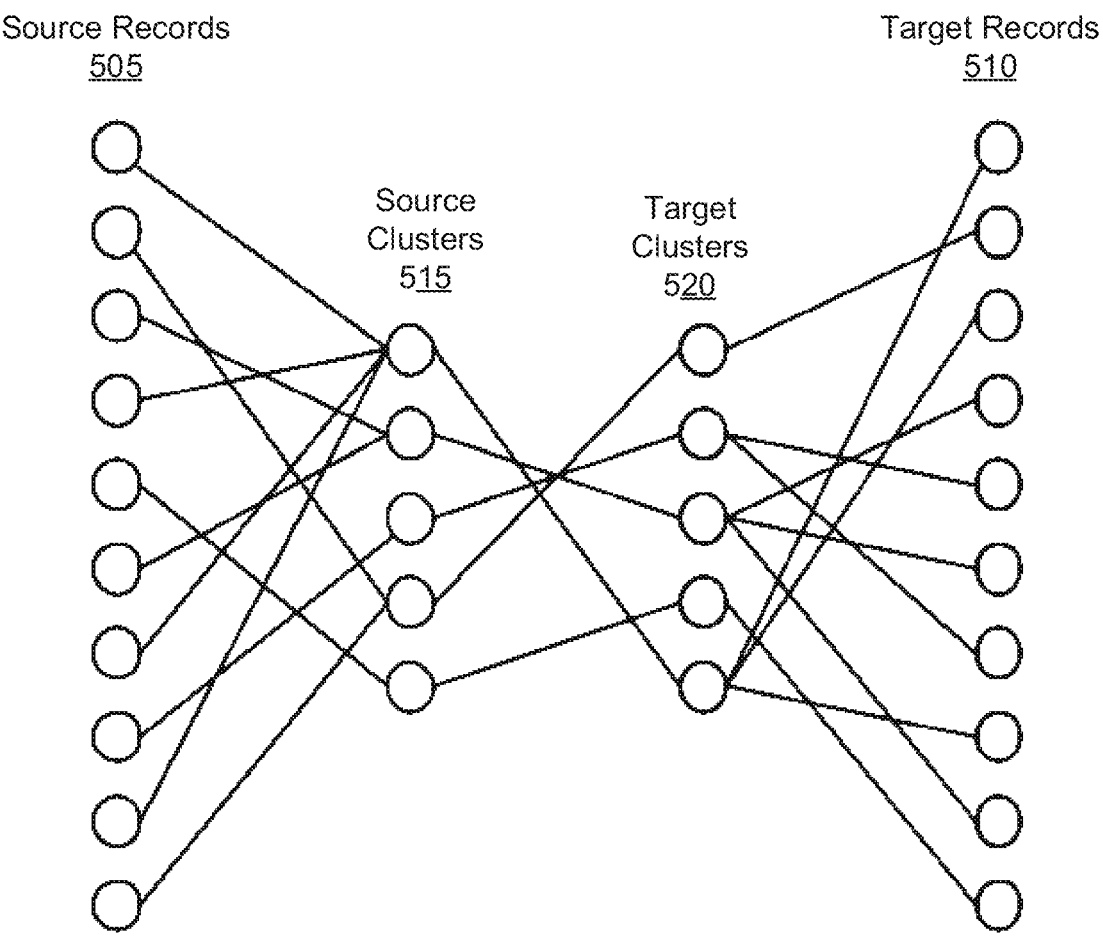
FIG. 5 shows illustrative "many-to-many" matching mode in accordance with one or more illustrative aspects discussed herein.

FIG. 5 depicts illustrative "many-to-many" matching mode in general. As shown in FIG. 5, the first column from the left may represent a plurality of source records 505, wherein each circle may represent one source record. As may be discussed in greater detail below, the plurality of source records 505 may be divided into one or more source clusters 515. As shown in FIG. 5, the second column from the left may represent the source clusters 515, wherein each circle may represent one source cluster. Each source cluster may comprise one or more source records. Source records in different source clusters may not be overlapping. The plurality of source records 505 may be divided based on a clustering algorithm. The clustering algorithm may be configured to group source records that have a level of similarity above a threshold into one cluster. A high level of similarity may indicate that the source records are related (e.g., associated with the same transaction or a series of related transactions in a double-entry accounting system). The level of similarity may be indicated as a distance value, as may be discussed above.

Similarly, the first column from the right may represent a plurality of target records 510, wherein each circle may represent one source record. As may be discussed in greater detail below, the plurality of target records 510 may be divided into one or more target clusters 520. As shown in FIG. 5, the second column from the right may represent the target cluster 520, wherein each circle may represent one target cluster. Each target cluster may comprise one or more target records. Target records in different target clusters may not be overlapping. The plurality of target records 510 may be divided based on a clustering algorithm. The clustering algorithm to cluster target records may be the same algorithm that clusters the source records, or may be a different algorithm that clusters the source records. The clustering algorithm may be configured to group target records that have a level of similarity above a threshold into one cluster. A high level of similarity may indicate that the target records are related (e.g., associated with the same transaction or a series of related transactions in a double-entry accounting system). The level of similarity may be indicated as a distance value, as may be discussed above.

The source clusters 515 may be matched with the target clusters 520 (e.g., by the data processing device 220). In the example shown in FIG. 5, one source cluster may be matched with one target cluster. But more than one source cluster may be matched with one target cluster, or more than one target cluster may be matched with one source cluster. The matching may be based on the distance between the source cluster and the target cluster, and/or additional rules (e.g., the total amount of balance indicated in the records) as discussed above.

The clustering algorithm may be optimized by a machine learning model. For example, the machine learning model may adjust parameters associated with the clustering. For example, the machine learning model may adjust a distance threshold for the source (or target) clustering. A distance threshold may be a threshold that is used to determine whether one or more source records, with a certain distance from each other, should be clustered together. For example, if the distance between two of the source (or target) records are shorter than the distance threshold, the system may determine the two source records are within the same cluster. For example, each two of the records within a given cluster may be shorter than the distance threshold. The machine learning model may also be trained to optimize the parameters used to calculate the distance value between two records in the first place, as may be discussed above in connection with FIG. 3. Optimized clustering parameters may improve the percentage of records that may be matched, or the accuracy of the matching.

Figure 6:
FIG. 6 shows an example correlation chart between distance threshold and matching rate in accordance with one or more illustrative aspects discussed herein.

FIG. 6 depicts a map 600, in a double-entry accounting system, that may indicate the correlation between credit-record distance threshold, debit-record distance threshold, and matching rate. As shown in FIG. 6, X-axis may indicate the distance threshold between credit records in a cluster (e.g., source records). For example, each two credit records in a given cluster may be shorter than the distance threshold. Y-axis may indicate the distance threshold between debit records in a cluster (e.g., target records). For example, each two of debit records in a given cluster is shorter than the distance threshold. The color of each grid in map 600 may indicate the percentage of the records that are able to be correctly matched based on current clustering algorithm (e.g., current distance threshold). The darker the color of the grid is, the lower the matching rate may be achieved under the current credit record distance threshold and debit record distance threshold. The lighter the color of the grid is, the higher the matching rate may be achieved under the current credit record distance threshold and debit record distance threshold. As may be shown in FIG. 6, the highest matching rate may be achieved at grid 620, which may correlate to a credit record distance threshold of 0.01 and a debit record distance of 0.56. It is appreciated the correlation between the matching rate, the credit record distance, and the debit record distance may be associated with the record-making approaches in a particular organization, as well as many other factors. If the record-making approaches change, the correlation between the distance thresholds and the matching rate may also be changed.

Figure 7:
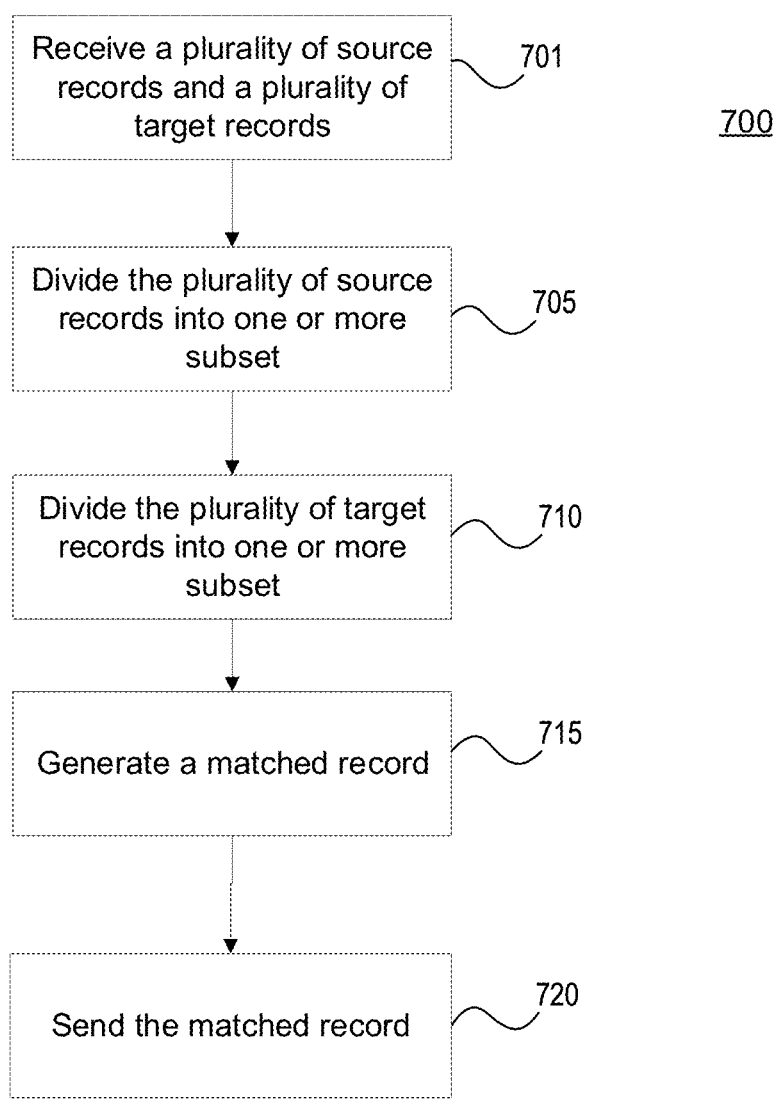
FIG. 7 is a flow diagram of another example method for processing records in accordance with one or more illustrative aspects discussed herein.

FIG. 7 is a flow diagram depicting a method 700 for processing data records under the "many to many" matching mode, in accordance with one or more illustrative aspects discussed herein. The steps in method 700 may be performed by a system comprising, for example, one or more cloud storage bucket 215, one or more cloud storage bucket 225, and one or more of the data processing device 220 as may be shown in FIG. 2.

At step 701, the system may receive a plurality of source records and a plurality of target records. For example, the plurality of source records and the plurality of target records may be similar to as discussed above in connection with FIG. 3.

At step 705, the system may divide the plurality of source records into one or more subsets (e.g., one or more clusters discussed in connection with FIGS. 5-6). The dividing may be based on a machine learning model comprising a clustering algorithm. The system may calculate the distance between source records and divide the plurality of source records based on a distance threshold. As discussed in connection with FIGS. 5-6, the distance of each two source records within a given subset may be shorter than the distance threshold. As discussed above in connection with FIG. 6, the distance thresholds may be optimized by the machine learning model to improve the matching rate or accuracy.

At step 710, the system may divide the plurality of target records into one or more subsets. The dividing may be similar to as described in step 705. The target records may be divided based on a second clustering algorithm with a second distance threshold. As discussed above in connection with FIG. 6, the second distance thresholds may be optimized by the machine learning model to improve the matching rate or accuracy.

At step 715, the system may generate a matched record comprising one or more subsets of the source records and one or more subsets of the target records.

In some examples, the system may match each source record subset with one target record subset (as may be shown in FIG. 5). For a given source record subset, the system may calculate the distance between the source record subset and each target record subset, and determine the target record subset having the shortest distance from a given source record subset that matches the source record subset. Additionally or alternatively, the system may determine the match based on a combination of distance and additional rules (e.g., whether the total balance amount of the two subsets equals zero, as discussed in FIG. 3).

In other examples, the system may match a source record subset with one or more target record subsets. The system may treat each subset as if it were one single record and determine the matching in a way similar to steps 315 to 330 as discussed in connection with FIG. 3.

At step 720, the system may send the matched record (e.g., to the first database 210). The matched record may be processed by the first database 210 similar to as discussed in step 335 as discussed above.

The steps of method 700 may be modified, omitted, or performed in other orders, or other steps added as appropriate.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
   receiving, by a computing device from a cloud storage device, a trigger command indicating a threshold is satisfied by a quantity of records that have been uploaded from a first database;
   receiving, by the computing device based on the trigger command, the uploaded records comprising a plurality of source records, from a first database, and a plurality of target records from a second database, wherein the first database is configured to store records of a different format from records in the second database;
   inputting, based on the trigger command and into a machine learning model, the plurality of source records and the plurality of target records;
   receiving, as output from the machine learning model, a selection of a subset of the plurality of source records and a subset of the plurality of target records, wherein the selection is based on:
      determining, for each of the plurality of target records, a distance value between:
         the respective target record, and
         the subset of the plurality of source records;
      ranking, based on the distance value of each of the plurality of target records, the plurality of target records;
      selecting, based on the ranking, the subset of target records of the plurality of target records;
   generating a matched record that indicates a matching between:
      the selected s subset of the plurality of target records, and
      the selected subset of the plurality of source records;
   sending, to the first database, the matched record; and updating, based on the matched record, the first database by changing a status of the subset of the plurality of source records from unmatched to matched.

2. The method of claim 1, wherein each of the plurality of source records and the plurality of target records is a transaction record that indicates a balance amount, and wherein generating the matched record is further based on determining that a total balance amount of the subset of the plurality of source records equals to a total balance amount of the selected one or more target records.

3. The method of claim 1, wherein the receiving the plurality of source records comprises receiving, from the first database via a cloud storage bucket, the plurality of source records.

4. The method of claim 3, wherein the plurality of source records and the plurality of target records are unmatched before being input into the machine learning model.

5. The method of claim 1, wherein each of the plurality of target records comprises a plurality of data fields, and wherein determining the distance value comprises:

identifying one or more data fields of the plurality of data fields; and calculating the distance value based on data within the one or more data fields.

6. The method of claim 1, wherein the distance value is a gower distance value.

7. The method of claim 1, further comprising:

dividing, based on a second machine learning model comprising a clustering algorithm, the plurality of source records into one or more subsets.

8. The method of claim 1, wherein selecting the subset of the plurality of source records comprises determining a distance value between each two source records of the subset does not exceed a threshold.

9. A system comprising:

a computing device, and a first database;

wherein the computing device comprising:

one or more processors;

instructions, when executed by the one or more processors, cause the computing device to:

receive, from a cloud storage device, a trigger command indicating a threshold is satisfied by a quantity of records that have been uploaded from a first database;

receive, based on the trigger command, the uploaded records comprising, a plurality of source records, from a first database, and a plurality of target records from a second database, wherein the first database is configured to store records of a different format from records in the second database;

input, based on the trigger command and into a machine learning model, the plurality of source records and the plurality of target records;

receive, as output from the machine learning model, a selection of a subset of the plurality of source records and a subset of the plurality of target records, wherein the selection is based on:

determine, for each of the plurality of target records, a distance value between:

the respective target record, and the subset of the plurality of source records;

rank, based on the distance value of each of the plurality of target records, the plurality of target records;

select, based on the ranking, the subset of the plurality of target records;

generate a matched record that indicates a matching between:

the selected subset of the plurality of target records, and the selected subset of the plurality of source records;

send, to the first database, the matched record; and update, based on the matched record, the first database by changing a status of the subset of the plurality of source records from unmatched to matched; and wherein the first database is configured to receive, from the computing device, the matched record.

10. The system of claim 9, wherein each of the plurality of source records and the plurality of target records is a transaction record that indicates a balance amount, and wherein the computing device is configured to generate the matched record further based on determining that a total balance amount of the subset of the plurality of source records equals to a total balance amount of the selected one or more target records.

11. The system of claim 9, wherein the instructions, when executed by the one or more processors, cause the computing device to receive the plurality of source records from the first database via a cloud bucket.

12. The system of claim 11, wherein the plurality of source records and the plurality of target records are unmatched before being input into the machine learning model.

13. The system of claim 9, wherein each of the plurality of target records comprises a plurality of data fields, and wherein the instructions, when executed by the one or more processors, cause the computing device to determine the distance value by:

identifying one or more data fields of the plurality of data fields; and calculating the distance value based on data within the one or more data fields.

14. The system of claim 9, wherein the distance value is a gower distance value.

15. The system of claim 9, wherein the instructions, when executed by the one or more processors, further cause the computing device to:

divide, based on a second machine learning model comprising a clustering algorithm, the plurality of source records into one or more subsets.

16. The system of claim 9, wherein the instructions, when executed by the one or more processors, cause the computing device to select the subset of the plurality of source records by determining a distance value between each two source records of the subset does not exceed a threshold.

17. A non-transitory computer-readable medium storing computer instruction that, when executed by one or more processors, cause performance of actions comprising:

receiving, by a computing device, from a cloud storage device, a trigger command indicating a threshold is satisfied by a quantity of records that have been uploaded from a first database;

receiving, by the computing device based on the trigger command, the uploaded records comprising a plurality of source records, from a first database, and a plurality of target records from a second database, wherein the first database is configured to store records of a different format from records in the second database;

inputting, based on the trigger command and into a machine learning model, the plurality of source records and the plurality of target records;

receiving, as output from the machine learning model and based on a clustering algorithm, a selection of a subset of the plurality of source records and a subset of the plurality of target records, wherein the selection is based on:

determining a distance value between each two source records of the subset does not exceed a threshold;

determining, based on a second machine learning model and for each of the plurality of target records, a distance value between:

the respective target record, and the subset of the plurality of source records;

ranking, based on the distance value of each of the plurality of target records, the plurality of target records;

selecting, based on the ranking, the subset of the plurality of target records;

generating a matched record that indicates a matching between:

the selected subset of the plurality of target records, and the selected subset of the plurality of source records;

sending, to the first database, the matched record; and updating, based on the matched record, the first database by changing a status of the subset of the plurality of source records from unmatched to matched.

18. The non-transitory computer-readable medium of claim 17, wherein each of the plurality of source records and the plurality of target records is a transaction record that indicates a balance amount, and wherein generating the matched record is further based on determining that a total balance amount of the subset of the plurality of source records equals to a total balance amount of the selected one or more target records.

19. The non-transitory computer-readable medium of claim 17, wherein the instructions, when executed by the one or more processor, cause receiving the plurality of source records from the first database via a cloud storage bucket.

20. The non-transitory computer-readable medium of claim 19, wherein the plurality of source records and the plurality of target records are unmatched before being input into the machine learning model.

* * * * *